(12) United States Patent
von Borcke-Morawitz et al.

(10) Patent No.: US 9,819,868 B2
(45) Date of Patent: Nov. 14, 2017

(54) GIMBAL MOUNT FOR A SENSOR

(71) Applicant: Dynamic Perspective GmbH, Vienna (AT)

(72) Inventors: Peter von Borcke-Morawitz, Vienna (AT); Stefan Morawitz, Vienna (AT)

(73) Assignee: Dynamic Perspective GmbH, Vienna (AT)

( * ) Notice: Subject to any disclaimer, the term of this patent is extended or adjusted under 35 U.S.C. 154(b) by 0 days.

(21) Appl. No.: 15/306,401

(22) PCT Filed: Apr. 24, 2015

(86) PCT No.: PCT/EP2015/058897
§ 371 (c)(1),
(2) Date: Oct. 24, 2016

(87) PCT Pub. No.: WO2015/162247
PCT Pub. Date: Oct. 29, 2015

(65) Prior Publication Data
US 2017/0048439 A1 Feb. 16, 2017

(30) Foreign Application Priority Data

Apr. 25, 2014 (AT) ............................. A50306/2014

(51) Int. Cl.
*H04N 5/228* (2006.01)
*H04N 5/225* (2006.01)
(Continued)

(52) U.S. Cl.
CPC ........... *H04N 5/2328* (2013.01); *B60R 11/04* (2013.01); *B64D 47/08* (2013.01); *F16M 11/12* (2013.01);
(Continued)

(58) Field of Classification Search
CPC ........ H04N 5/2328; H04N 5/77; H04N 7/183; G03B 17/561; G03B 15/006; H02N 2/108;
(Continued)

(56) References Cited

U.S. PATENT DOCUMENTS

| 4,498,038 A | 2/1985 | Malueg |
| 5,897,223 A | 4/1999 | Tritchew et al. |

(Continued)

FOREIGN PATENT DOCUMENTS

| EP | 0559402 A2 | 9/1993 |
| WO | 2013098386 A1 | 7/2013 |

OTHER PUBLICATIONS

Austrian Search Report, Application No. A50306/2014, dated Mar. 12, 2015, 1 page.
(Continued)

*Primary Examiner* — Twyler Haskins
*Assistant Examiner* — Carramah J Quiett
(74) *Attorney, Agent, or Firm* — Whitmyer IP Group LLC

(57) ABSTRACT

A gimbal mount for a sensor having an outer and inner gimbal mount to stabilize vibrations in a wide frequency band without having to statically balance the sensor. A direct drive is provided for at least one drive of an outer axis of rotation of the outer gimbal mount and an amplified piezo actuator is provided for at least one drive of an inner axis of rotation of the inner gimbal mount. The at least one outer axis of rotation is provided for vibration stabilization in a first range of the frequency band to be stabilized and the at least one inner axis of rotation stabilization is provided for vibration stabilization in a second range in the frequency band to be stabilized. The outer gimbal mount and the inner gimbal mount are embodied as mechanically rigid construc-
(Continued)

tions which transmit vibrations in the frequency band to be stabilized essentially without damping.

20 Claims, 4 Drawing Sheets

(51) Int. Cl.

| | |
|---|---|
| *B64C 17/06* | (2006.01) |
| *H04N 5/232* | (2006.01) |
| *G01C 21/18* | (2006.01) |
| *G03B 15/00* | (2006.01) |
| *H02N 2/10* | (2006.01) |
| *G03B 17/56* | (2006.01) |
| *B60R 11/04* | (2006.01) |
| *B64D 47/08* | (2006.01) |
| *F16M 11/12* | (2006.01) |
| *F16M 11/18* | (2006.01) |
| *H04N 5/77* | (2006.01) |
| *H04N 7/18* | (2006.01) |
| *B60R 11/00* | (2006.01) |

(52) U.S. Cl.
CPC ............. *F16M 11/18* (2013.01); *G01C 21/18* (2013.01); *G03B 15/006* (2013.01); *G03B 17/561* (2013.01); *H02N 2/108* (2013.01); *H04N 5/77* (2013.01); *H04N 7/183* (2013.01); *B60R 2011/0089* (2013.01); *B60R 2011/0092* (2013.01); *F16M 2200/041* (2013.01)

(58) Field of Classification Search
CPC .. B64D 47/08; G01C 21/18; F16M 2200/041; F16M 11/12; F16M 11/18; B60R 2011/0089; B60R 11/04; B60R 2011/0092
See application file for complete search history.

(56) References Cited

U.S. PATENT DOCUMENTS

| | | | |
|---|---|---|---|
| 6,154,317 A | * | 11/2000 | Segerstrom ............ F16M 11/08 250/203.1 |
| 6,384,515 B1 | | 5/2002 | Ganor et al. |
| 7,561,784 B2 | | 7/2009 | Wescott et al. |
| 7,812,507 B2 | | 10/2010 | Takahashi et al. |
| 2005/0052531 A1 | * | 3/2005 | Kozlov ................. B66F 11/048 348/143 |
| 2007/0050139 A1 | | 3/2007 | Sidman |
| 2009/0160951 A1 | | 6/2009 | Anderson et al. |
| 2011/0241971 A1 | | 10/2011 | Bateman et al. |
| 2014/0013870 A1 | | 1/2014 | Brauchle et al. |

OTHER PUBLICATIONS

Written Opinion of the International Searching Authority, Application No. PCT/EP2015/058897, dated Sep. 21, 2015, mailed Oct. 12, 2015, 10 pages.

International Preliminary Examination Report, Application No. PCT/EP2015/058897, dated Apr. 20, 2016, 6 pages.

* cited by examiner

GIMBAL MOUNT FOR A SENSOR

CROSS-REFERENCE TO RELATED APPLICATIONS

This patent application claims the benefit of Austrian application A50306/2014, filed on Apr. 25, 2014, and PCT application PCT/EP2015/058897, filed on Apr. 24, 2015, and the content of both applications are incorporated herein by reference in their entirety.

TECHNICAL FIELD

The present invention relates to a gimbal mount for vibration stabilization in a frequency band to be stabilized for at least one sensor arranged on a sensor holder with an outer gimbal mount having a number of degrees of freedom and an inner gimbal mount arranged on the outer gimbal mount also having a number of degrees of freedom, wherein each degree of freedom is formed by an axis of rotation, and each axis of rotation is driven by a drive.

BACKGROUND

For mounting sensors, such as video cameras, photographic equipment, infrared sensors, etc., for example, on vehicles such as airplanes, helicopters, land vehicles or aquatic vessels, etc., gimbal mounts are often used. To do so, the sensor is mounted on the gimbal mount which is in turn fastened to a part of the vehicle. Gimbal mounts allow movement of the sensor about a number of axes, usually a roll axis, a yaw axis and a pitch axis. There may also be multiple roll, yaw and/or pitch axes. The existing axes are therefore structurally nested one inside the other to enable movement of the sensor about all existing axes. For active movement about the axes provided, individual axes or all axes may also be driven. This makes it possible to position and/or align the sensor that is mounted on the gimbal mount by means of active control of the axes in any desired manner (within the limits of movement). This is important in particular when the sensor must remain aligned at a certain point during the movement of the vehicle. The inner axes are often used for fine positioning and the outer axes are used for approximate positioning of the sensor. Such a gimbal mount is described in U.S. Pat. No. 7,561,784 B2, for example.

However, while the vehicle is moving, vibrations are also introduced into the gimbal mount. A sensor on a gimbal mount must be decoupled from these vibrations for proper functioning and/or the position of the sensor (and/or its alignment) with respect to the vibrations must be stabilized. In the case of a sensor supported on a gimbal mount and mounted on a helicopter, vibrations of only a few angle seconds would result in a significant deviation from the targeted position. For example, without such vibration stabilization, no stable images could be recorded with a video camera because of such vibrations. Therefore, a great deal of effort has been put into the development of systems for vibration stabilization of gimbal mounts.

To keep vibrations away from the sensor, gimbal mounts have already been proposed, in which an inner gimbal mount is supported in a vibration-decoupled support in an outer gimbal mount, as disclosed in U.S. Pat. No. 5,897,223 A, for example. In this case, an inner gimbal mount is disposed in a spring-mounted shell, wherein the spring-mounted shell is itself supported in the outer gimbal mount. The inner gimbal mount is fastened to a gimbal mount point in the shell. Due to the spring-mounted shell the inner gimbal mount is vibration decoupled from the outer gimbal mount. However, this means that the inner gimbal mount needs to be mounted on its mount in a statically accurately balanced way. Any change in or replacement of the sensor is thus no longer readily possible because it would then be necessary to first repeat the static balancing of the mount of the inner gimbal mount.

U.S. Pat. No. 7,812,507 B2 describes a gimbal-mounted camera in which the gimbal mount is driven by a piezoelectric motor. A piezoelectric motor is known to be a motor in which vibration of one or more piezoelectric elements is converted into a movement of a movable part, for example, a linear movement. In a piezoelectric motor a vibration of the piezoelectric element is thus converted into a continuous movement (either a linear movement or a rotational movement). In the case of U.S. Pat. No. 7,812,507 B2, the vibration of a three-dimensional piezoelectric unit is utilized to move a spherical gimbal-mounted camera mount by means of friction. This movement is also utilized to compensate for vibrations. Thus, here, there is direct stabilization of the camera mount with respect to outer vibrations. However, because of the limited torque that can be generated with such a piezoelectric motor, there can only be low payloads and they can only be moved with poor dynamics. Rapid equalizing movements such as those which would be necessary for stabilizing vibrations of a higher frequency, cannot be implemented in this way, in particular not for payloads of a greater weight.

SUMMARY

It is an object of the present invention to provide a gimbal mount for a sensor, which will make it possible to stabilize vibrations in a broad frequency band without having to statically balance the sensor and/or the sensor with the mount.

This object is achieved according to the invention in that a direct drive is provided for at least one drive of the outer axis of rotation of the outer gimbal mount and amplified piezo actuators are provided for at least one drive of the inner axis of rotation of the inner gimbal mount, wherein the at least one outer axis of rotation is provided for vibration stabilization in a first range of the frequency band to be stabilized, and the at least one inner rotation coordinate is provided for vibration stabilization in a second range of the frequency band to be stabilized, wherein the second range of the frequency band to be stabilized is situated at least partially above the first range of the frequency band to be stabilized, and wherein the outer gimbal mount and the inner gimbal mount are embodied as a mechanically rigid construction, which transmits vibrations in the frequency band to be stabilized essentially without any damping. This combination of a direct drive on an outer axis of rotation and an amplified piezo actuator on an inner axis of rotation as well as the mechanically rigid construction makes it possible to position the sensor highly dynamically even without static balancing and to stabilize it with respect to vibrations over a broad frequency band. This permits very flexible use of the gimbal mount because sensors can be replaced easily, since it is no longer necessary to balance them. Preferably all the axes of rotation of the outer gimbal mount are embodied with direct drives and all the axes of rotation of the inner gimbal mount are embodied with amplified piezo actuators.

Advantageous embodiments of the gimbal mount according to the invention are derived from the dependent claims and from the following description.

BRIEF DESCRIPTION OF THE DRAWINGS

The present invention is explained in greater detail below with reference to FIGS. 1 to 5 which show schematically and as examples nonrestrictive advantageous embodiments of the invention, in which.

DETAILED DESCRIPTION

Figure 1:
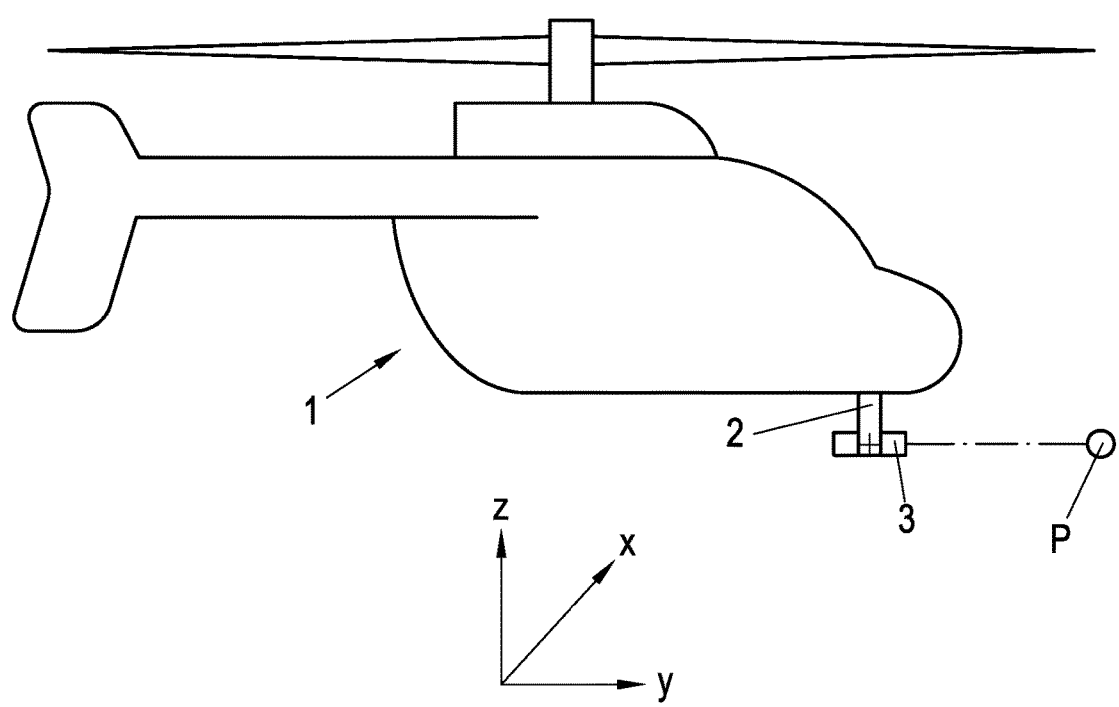
FIG. 1 is shows the arrangement of a gimbal mount according to the invention on a vehicle.

FIG. 1 shows a helicopter as an example of vehicle 1, on which a gimbal mount 2 is mounted, with a sensor 3, for example in the form of a video camera, being mounted thereon. Of course several sensors 3 may also be mounted on the gimbal mount 2. The sensor 3 is mounted on the vehicle by means of the gimbal mount 2, so that it can rotate about a roll axis y, a pitch axis x and a yaw axis z. The sensor 3 can be aligned with a certain point P in space by pivoting it about the axes (within the possible limits of movement), as indicated in FIG. 1. The gimbal mount 2 serves, on the one hand, to accurately align the sensor 3 with the desired point P during the movement of the vehicle 1 and, on the other hand, serves to stabilize the sensor 3 with respect to any vibrations that might occur due to the movement of the vehicle 1 or due to the vehicle 1 itself, for example caused by its drive units. Stabilizing the sensor 3 means that movements of the sensor 3 caused by vibrations are compensated in a wide frequency band, in particular in the range from 1 Hz to 150 Hz, so that the alignment of the sensor 3 with the point P is not disturbed within a tolerance range. This requires high dynamics (acceleration rate) of the actuators of the gimbal mount 2 and a high angular accuracy of the actuators. Any required sensors, such as angle sensors on the axes, gyroscopes or acceleration sensors for detecting positions, speeds or accelerations, must of course also fulfill the accuracy requirements.

If a video camera with an HD image resolution of 1920×1080 pixels is used as sensor 3, as an example, and if a maximum error of 1 pixel is required for a video recording of an object during movement of vehicle 1 at an object distance of 100 meters from the sensor 3 and an image diagonal of 5 meters, then an angle accuracy of <0.003° must be achieved. All of this must be ensured at high payloads, for example, video cameras including the lens can have a weight of 10 kg and the gimbal mount 2 can have an inherent weight of 10 mg, and high acceleration forces through the movement of vehicle 1 should be possible. These requirements of the gimbal mount 2 and its actuators are consequently challenging.

This precision is achieved by the design of the gimbal mount according to the invention, as will be described below with reference to FIGS. 2 and 3 as examples.

Figure 2:
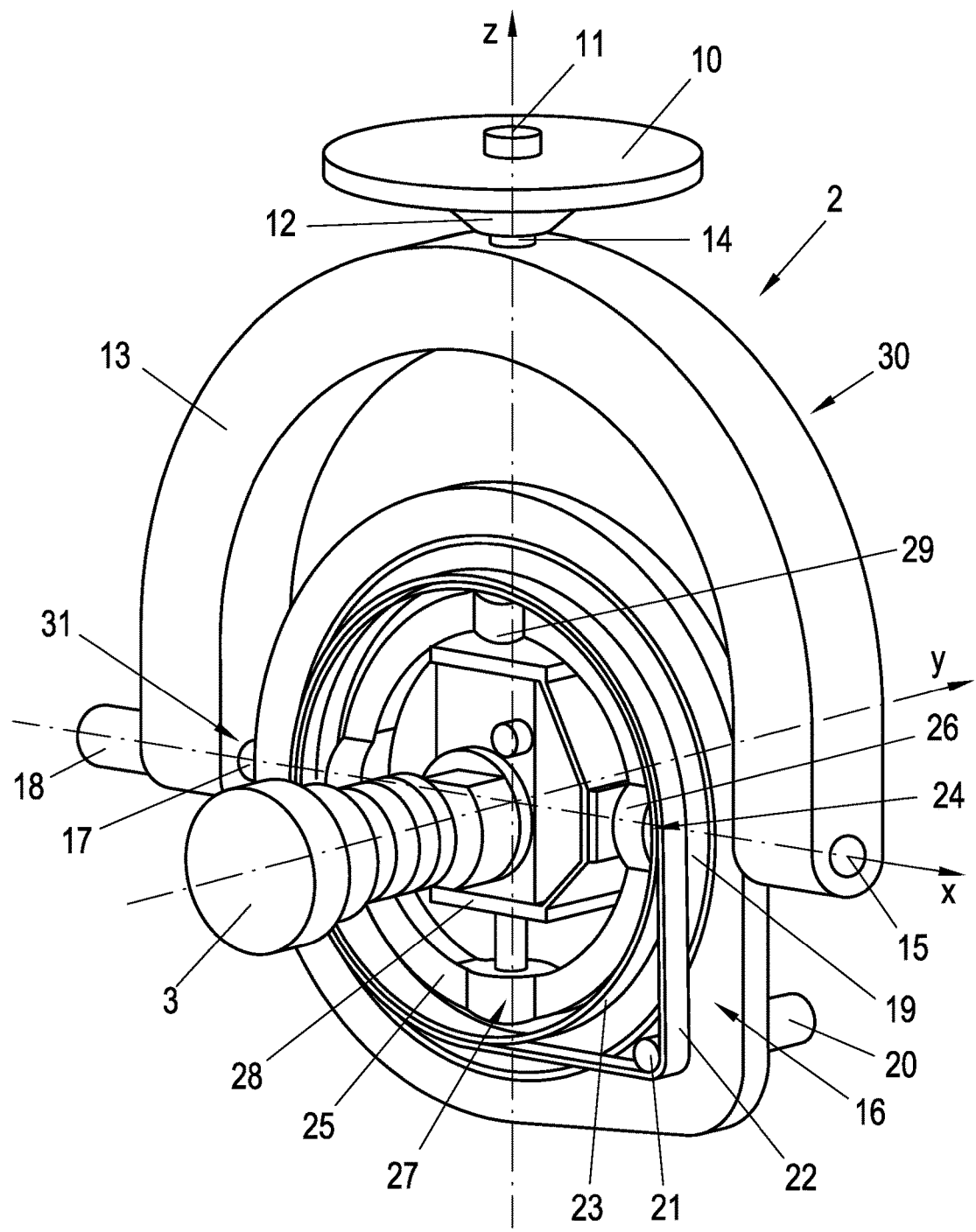
FIGS. 2 and 3 show various views of an advantageous embodiment of the gimbal mount according to the invention.

The gimbal mount 2 according to FIG. 2 is designed as a five-axis gimbal mount 2 with an outer gimbal mount 30 and inner gimbal mount 31 disposed on the outer gimbal mount 30. Five axes of course means five degrees of freedom of the gimbal mount 2, where each degree of freedom is formed by an axis of rotation.

A first outer axis of rotation 11, here a yaw axis, is provided on a mounting part 10, with which the gimbal mount 2 can be mounted on the vehicle 1. To do so, a rigid holding frame 13 is mounted on the fastening part 10, so that it can rotate about the first outer axis of rotation 11. The holding frame 13 is rotated by means of a yaw direct drive 12 relative to the fastening part 10.

In the case of a direct drive, the electric motor is connected directly to the driven part, in particular without an intermediate gear or other transmission means such as belts, etc. With a very compact design, direct drives are characterized by a very high specific energy density (available energy based on the mass of the direct drive) and a very high achievable accuracy with regard to the control of the angular position. The direct drive may thus be embodied in such a way that the stator of the electric motor is disposed on a stationary component and the rotor of the electric motor is disposed on a rotational shaft. In the exemplary embodiment shown in FIG. 2, the stator could thus be arranged on the mounting part 10, and the rotor of the direct drive 12 could be mounted on a rotational shaft 14, which is itself mounted to rotate and on which the holding frame 13 is mounted in a rotationally fixed manner. In this way, the holding frame 13 can be rotated directly by the electric motor of the direct drive 12.

A second outer axis of rotation 15, namely here a first pitch axis, is provided on the holding frame 13. An outer rolling ring 16 is mounted on this axis of rotation 15 so that it can be pivoted about the second outer axis of rotation 15. To do so, a first pitch shaft 17, on which the outer rolling ring 16 is mounted in a rotationally fixed manner, is mounted in the holding frame 13 so that it can be rotated to form the second outer axis of rotation 15. In addition, a pitch direct drive 18, with which the outer rolling ring 16 can be rotated about the second outer axis of rotation 15 with respect to the holding frame 13, is also arranged on the holding frame 13.

The first outer axis of rotation 11 and the second outer axis of rotation 15 are preferably embodied as a shaft and/or a shaft journal and respective bearing, for example, in the form of a roller bearing.

An inner rolling ring 19 is mounted in the outer rolling ring 16 so that it can rotate about the roll axis y, for example, by means of a concentric roller bearing. To that end, outer rolling ring 16 and inner rolling ring 19 are advantageously nested concentrically one inside the other.

A rolling drive 20 is provided on the outer rolling ring 16, for example, again a direct drive or a servo motor, which rotates the inner rolling ring 19 with respect to the outer rolling ring 16. In the exemplary embodiment shown here, the rolling drive 20 drives a first pulley 21, and the inner rolling ring 19 serves as a second pulley. A belt 22 is guided around the first and second pulleys. The inner rolling ring 19 has a radial step on its outer circumferential surface to form a running surface 23 for the belt 22. However, the first pulley 21 may also be formed directly by the rotor of a direct drive.

However, the outer gimbal mount 30 may of course also be designed with fewer axis of rotations and/or with a different configuration of the axis of rotations. For example, an outer gimbal mount 30, in which the roll axis y is arranged between the first outer axis of rotation 11 in the form of a yaw axis and the second outer axis of rotation 15 in the form of a pitch axis would be conceivable. In this case, the holding frame 13 could be embodied as an annular holding frame, which assumes the function of the outer rolling ring. The inner rolling ring 19 would then be arranged concentrically in the annular holding frame. The second outer axis of rotation 15 would be arranged between the inner rolling ring 19 and a connecting ring to the inner gimbal mount 31. The inner gimbal mount 31 would then be arranged on the connecting ring. The rolling drive 20 would then also be arranged on the holding frame 13.

However, only one axis of rotation, for example, only the second outer axis of rotation 15 may be provided in the outer gimbal mount 30. In this case, for example, the holding frame 13 would be rigidly connected to the fastening part 10.

The inner gimbal mount 31 is arranged on a part of the outer gimbal mount 30 in particular on the innermost movable part of the outer gimbal mount, as on the inner rolling ring 19 as in the exemplary embodiment shown, or also on the connecting ring with reversal of the roll axis y and the second outer axis of rotation 15.

In the inner rolling ring 19, a first inner axis of rotation 24, in this case a second pitch axis, is provided. To this end an intermediate ring 25 is arranged on the inner rolling ring 19 so that it can pivot about the first inner axis of rotation 24. The intermediate ring 25 is here connected to the inner rolling ring 19 by a pitch joint 26.

A second inner axis of rotation 27, here a second yaw axis, is provided on the intermediate ring 25. To this end a sensor holder 28 is arranged on the intermediate ring 25 so that it can pivot about the second inner axis of rotation 27. The sensor holder 28 here is connected to the intermediate ring 25 via a yaw joint 29. A sensor 3, such as a video camera with a lens, for example, is fastened in the sensor holder 28.

The first inner axis of rotation 24 and the second inner axis of rotation 27 are preferably again embodied as a shaft and/or shaft journal and respective bearing, for example, in the form of a roller bearing.

Figure 3:
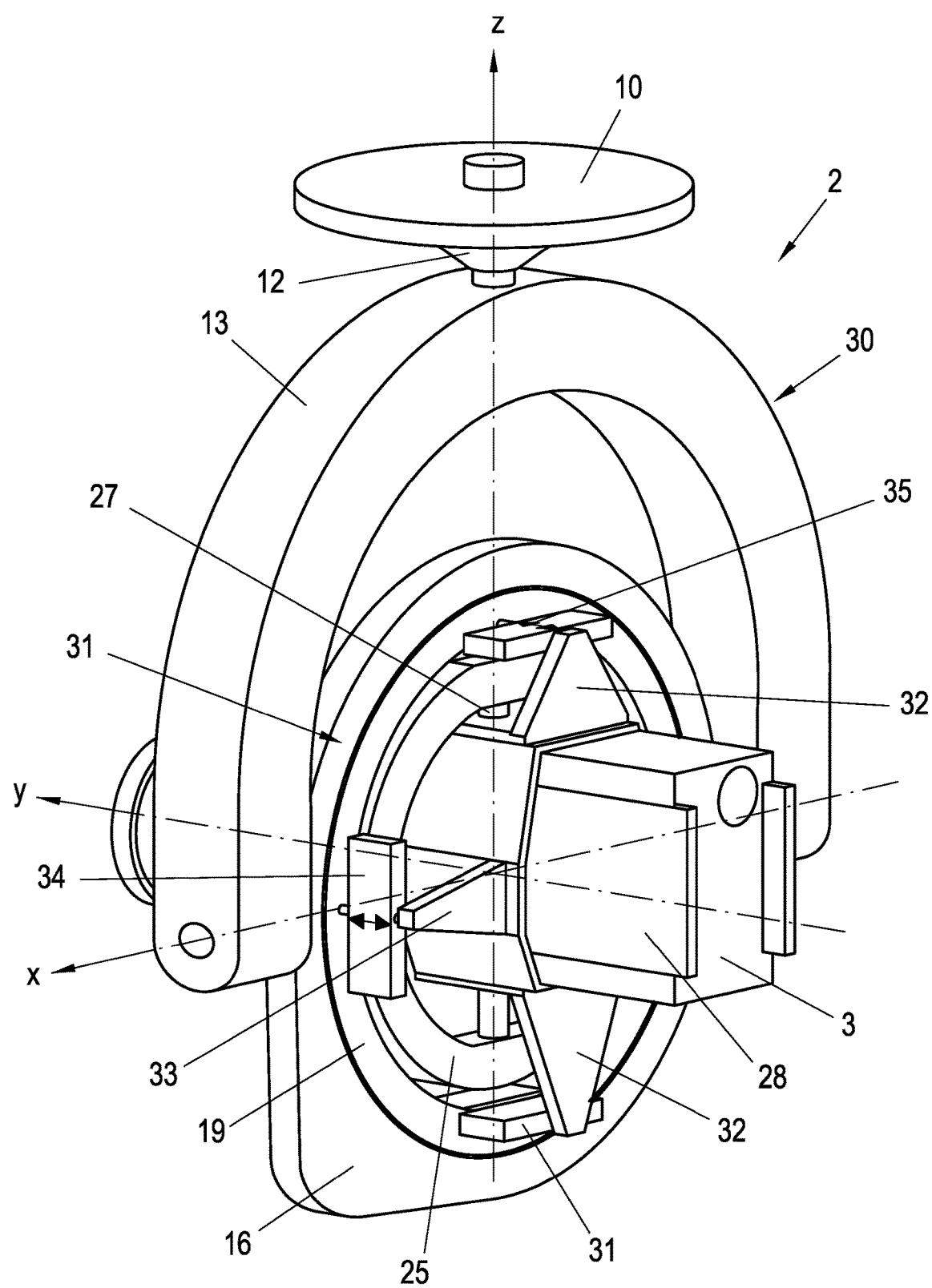

The pivoting about the first inner axis of rotation 24, here a pitch axis, and the second inner axis of rotation 27, here a yaw axis, is achieved by amplified first and second piezo actuators 34, 35, as shown more clearly in FIG. 3. Amplified piezo actuators 34, 35 are actuators which scale up the possible very small movements (elongations) of piezo actuators to large movements. In doing so, only the stroke of the piezoelectric element, which is installed in the amplified piezo actuators 34, 35, is converted into a larger stroke, usually by means of a mechanical transmission of the stroke. The stroke of the amplified piezo actuators 34, 35 then follows the stroke of the installed piezoelectric elements. Amplified piezo actuators 34, 35 are characterized by high precision, great force (torque), wide bandwidth and compact size for travel distances of up to 1 mm. Such amplified piezo actuators 34, 35 are sufficiently well known and are available in various embodiments, which is why they will not be discussed further here.

In the exemplary embodiment shown in FIG. 3 a pair of piezo actuators is provided in each case for pivoting about an axis of rotation, namely second piezo actuators 34 for the second inner axis of rotation 27 and first piezo actuators 35 for the first inner axis of rotation 24. However, more or fewer piezo actuators 34, 35 may of course also be provided per axis of rotation.

The first piezo actuators 35 for the first inner axis of rotation 24 are, on the one hand, arranged on the inner rolling ring 19 and, on the other hand, on the sensor holder 28. To do so, first supports 32 are provided on the sensor holder 28, with which the first piezo actuators 35 are connected with a joint. Actuating the first piezo actuator 35 (indicated by the double arrow) causes the sensor holder 28 to pivot about the first inner axis of rotation 24. The two first piezo actuators 34 in FIG. 3 must of course operate in opposition here.

The second piezo actuators 34 for the second inner axis of rotation 27, on the one hand, are disposed on the inner rolling ring 19 and, on the other hand, on the sensor holder 28. To do so, second supports 33, with which the second piezo actuators 34 are connected via a joint are provided on the sensor holder 28. The second supports 33 are arranged with an offset by a certain angle, preferably 90°, with respect to the first supports 32. Actuating the second piezo actuator 34 (indicated by the double arrow), causes the sensor holder 28 to pivot about the second inner axis of rotation 27. In the case of two second piezo actuators 34, these would of course again have to operate in opposition to one another.

Because of the articulated connection of the first piezo actuator 35 and the second piezo actuator 34 on the respective supports 32, 33 and also because of the small travel distances of up to 1 mm, it is possible in this way to pivot about both inner axis of rotations 24, 27, In addition, the second piezo actuator 34 and the first piezo actuator 35 may also be connected to the inner rolling ring 19 in an articulated connection.

In an alternative embodiment, the second piezo actuator 34 could not be attached to the inner rolling ring 19 but could instead be attached to the intermediate ring 25.

The gimbal mount 2 shown in the figures is described as a five-axis mount. However, the gimbal mount 2 could of course also include more degrees of freedom or fewer degrees of freedom (axis of rotations). For example, it would be possible to omit the roll axis y, so that the outer rolling ring 16 and the rolling drive 20 and/or the pulleys 21 and the belts 22 could also be omitted. In this case, the inner rolling ring 19 would be pivotably arranged on the holding frame 13 via the second outer axis of rotation 15.

In general, the gimbal mount 2 includes an outer gimbal mount 30 having a number of degrees of freedom, formed in the exemplary embodiment shown here by the mounting part 10, the holding frame 13 and the outer and inner rolling rings 16, 19 and the respective axis of rotations, bearings and drives, and an inner gimbal mount 31 arranged on a portion of the outer gimbal mount 30, formed in the exemplary embodiment shown here by the intermediate ring 25 and the sensor holder 28 and the respective axes, bearings and drives. The outer gimbal mount 30 and the inner gimbal mount 31 are connected to one another via the inner rolling ring 19. If no roll axis y is needed, then instead of the outer rolling ring 16, the inner rolling ring 19 may be arranged directly on the holding frame 13 of the outer gimbal mount 30.

If the inner gimbal mount 31 has only one degree of freedom, for example, only the first inner axis of rotation 24 or only the second inner axis of rotation 27, the intermediate ring 25 may be omitted. In this case the sensor holder 28 would pivotably be connected to the inner rolling ring 19 via the respective axis of rotation 24, 27 and the corresponding amplified piezo actuators 34, 35.

It is also conceivable to alter the sequence of the inner axis of rotations 24, 27, i.e. the second pitch axis and the second yaw axis, in the inner gimbal mount 31 so that, for example, the second inner axis of rotation 27 is provided between the inner rolling ring 19 and the intermediate ring 25.

The gimbal mount 2 according to the invention makes it possible on the one hand to align the sensor 3 with high precision and on the other hand to stabilize the sensor 3 with respect to vibrations, which is also a prerequisite for high precision alignment of the sensor 3. This is made possible first by the fact that the first and second axis of rotations 11, 15, i.e. the first yaw axis and the first pitch axis, can be actuated and controlled by the direct drives with a high energy density and high positioning accuracy. Thus the sensor 3 can be positioned in a highly dynamic manner within a certain frequency range. By that, control accuracies for frequencies of up to about 20 Hz as good as 0.01 degree are possible. Since the drive for the outer axis of rotations is provided by direct drives, the gimbal mount 2 is also capable of at least partially regulating out vibrations in a certain frequency range due to the first outer axis of rotation 11 and the second outer axis of rotation 15. The remaining vibrations in this frequency range, i.e. 1 Hz to approx. 20 Hz, and vibrations in a higher frequency range, approx. 20 Hz to approx. 150 Hz. are regulated out by the inner axis of rotations 24, 27, i.e. the second yaw axis and the second pitch axis or in other words by their piezo actuators 34, 35.

To this end it is provided that the vibrations in this frequency range are introduced from the outer gimbal mount 30 into the inner gimbal mount 31 essentially without being dampened. Only when the vibrations (oscillations) in the frequency bands to be stabilized are introduced with the least possible damping can they be compensated by a highly dynamic control. If the damping were too high, for example due to a flexurally or torsionally soft construction, control interventions would also be dampened accordingly, which would prevent a highly dynamic control. The structural elements of the gimbal mount 2 may be considered as a low-pass filter in their vibration behavior. Vibrations with frequencies below a certain cutoff frequency are thus transmitted approximately without attenuation, whereas vibrations above the cutoff frequency undergo attenuation, which is to some extend substantial. To now be able to transmit the vibrations in the frequency bands to be stabilized with the least possible damping, the cutoff frequency of the gimbal mount 2 must be at least above the frequency range to be stabilized, preferably significantly above.

The structure of the gimbal mount 2, consisting of mounting part 10 and the holding frame 13 and preferably also the outer and inner rolling rings 16, 19 and the intermediate ring 25 as well as the bearing situated in between, is designed with sufficient mechanical rigidity, so that the vibrations in the frequency ranges to be stabilized are transmitted essentially without damping. This may be achieved, for example, by choosing suitable composite materials or through structural design of the holding frame 13.

For the roll axis y, such precision is not usually required, which is why the requirements of the drive of the roll axis y are much lower and can be implemented with traditional drives.

Figure 4:
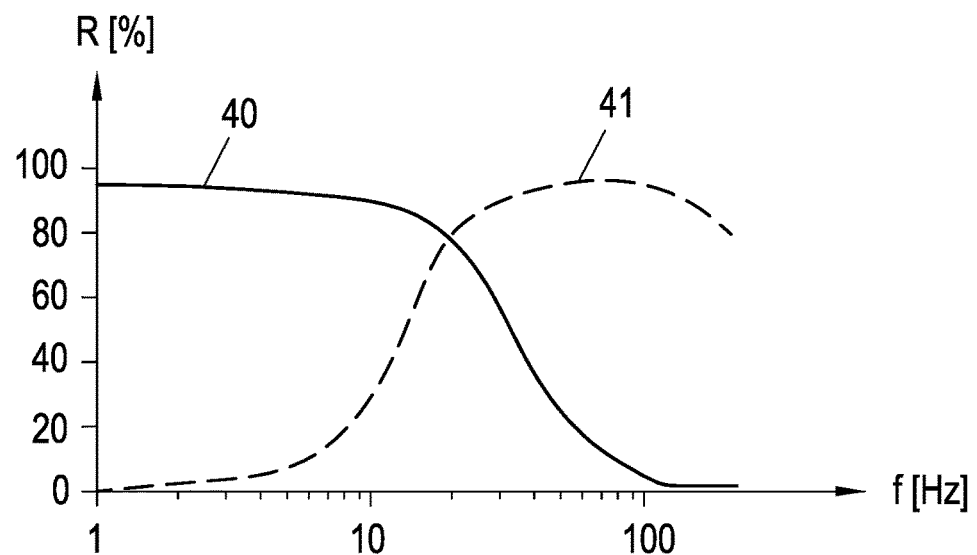
FIG. 4 shows the control efficiency of the gimbal mount according to the invention and FIG. 5 shows the control scheme of the gimbal mount according to the invention.

FIG. 4 shows the efficiency of the vibration stabilization of the gimbal mount 2 according to the invention. This shows the control efficiency R of the outer axis of rotations 11, 15, driven by direct drive, i.e. the first yaw axis and the first pitch axis, and the inner axis of rotations 24, 27, driven by the piezo actuators 34, 35, i.e. the second yaw axis and the second pitch axis. The control efficiency R here denotes the measure by which vibrations of a certain frequency can be compensated. A control efficiency R of 100% would mean that vibrations of a certain frequency can be fully compensated. In the low frequency range (to approx. 20 Hz), the direct drives regulate the input disturbances (vibrations) with a high efficiency curve 40. The control efficiency R decreases with an increase in frequency f because of the moment of inertia. Above a certain frequency (in the range of >20 Hz), the control efficiency of the direct drives declines drastically because of its limited control bandwidth. In the high frequency range (above approx. 20 Hz), the amplified piezo actuators 34, 35 regulate with a high control efficiency R—curve 41. In the low frequency range, however, the control efficiency R of the amplified piezo actuators 34, 35 is limited because of the limited travel distance (<1 mm). Consequently, due to the combination of direct drives on the outer axes and amplified piezo actuators 34, 35 on the inner axes, it is possible to regulate the external disturbances (vibrations) out with a high precision over a wide frequency range (1 Hz to approx. 150 Hz). The gimbal mount 2 can thus be aligned and stabilized with a high precision in this frequency range.

Even higher frequencies (greater than approx. 150 Hz) can be filtered out by vibration decoupling at the mount between vehicle 1 and gimbal mount 2. Special mounts, which are capable of decoupling such vibrations from the gimbal mount 2, are known for this purpose.

For certain applications, it may be sufficient if at least one of the outer axes of rotation 11, 15, for example, the first pitch axis 15, is driven with a direct drive 18. Likewise, it may be sufficient if at least one of the inner axes of rotation 24, 27, for example, the second yaw axis, is driven with an amplified piezo actuator 34.

Figure 5:
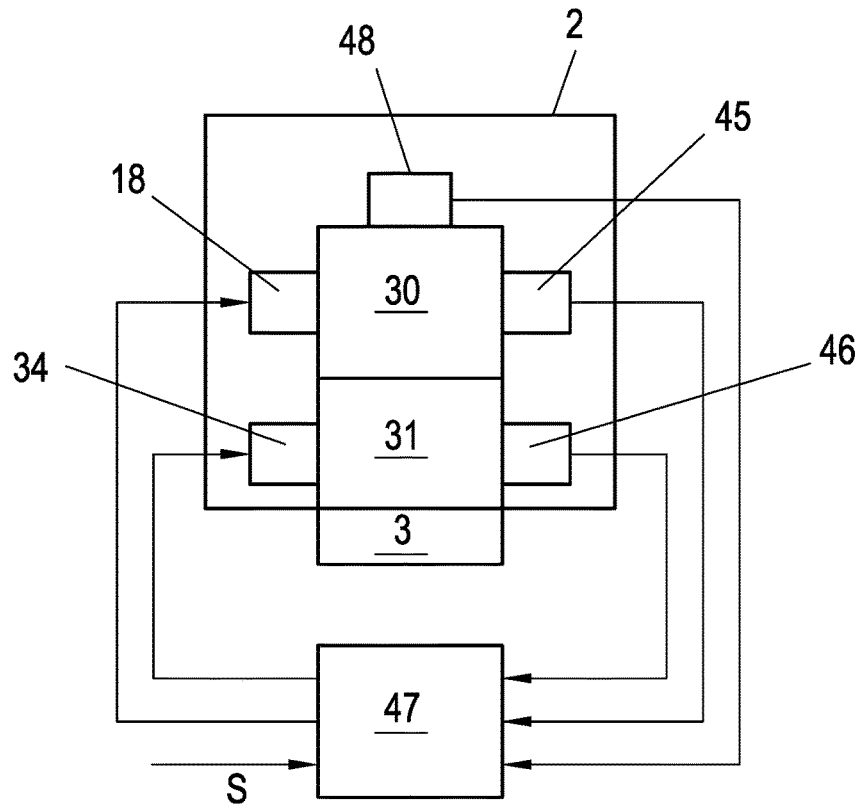

The control concept is diagrammed schematically in FIG. 5. The gimbal mount 2, which supports the sensor 3, is shown here without restriction only as a biaxial gimbal mount, with an outer gimbal mount 30 having one outer axis of rotation 15, for example the first pitch axis, and an inner gimbal mount 31 having one inner axis of rotation 27, for example the second yaw axis. A pitch direct drive 18 is provided on the axis of rotations 15, 27, as described above, on the outer gimbal mount 30, and an amplified piezo actuator 34 is provided on the inner gimbal mount 31. Additional position sensors 45, 46, for example optoelectronic angle sensors, are installed on the axis of rotations 15, 27 of the gimbal mount 2 in order to be able to determine the actual angular position of the axis of rotations 15, 27. In addition, other sensors 48, for example gyroscopes or acceleration sensors may also be provided on the gimbal mount 2. The position sensors 45, 46 and the sensors 48 transfer their measured values to a control unit 47, in which a suitable controller is implemented for controlling the axis of rotations 15, 27 of the gimbal mount 2. The controller in the control unit 47 controls the actuation of the drives of the axis of rotations 15, 27 on the basis of given setpoint values S in order to align the sensor 3 accurately, on the one hand, and to keep it aligned and also to compensate vibrations in the gimbal mount 2.

The invention claimed is:

1. A gimbal mount for vibration stabilization in a frequency band to be stabilized for at least one sensor arranged on a sensor holder, the gimbal mount comprising:
   an outer gimbal mount having a number of degrees of freedom;
   an inner gimbal mount arranged on the outer gimbal mount and having a number of degrees of freedom;
   wherein each degree of freedom is formed by an axis of rotation and each axis of rotation is driven by a drive;
   wherein the drive provided for a first outer axis of rotation of the outer gimbal mount is a direct drive, and the drive provided for a first inner axis of rotation of the inner gimbal mount is an amplified piezo actuator, wherein the first outer axis of rotation is provided for vibration stabilization in a first range of the frequency band to be stabilized, and the first inner axis of rotation is provided for vibration stabilization in a second range of the frequency band to be stabilized, wherein the second range of the frequency band to be stabilized is at least partially located above the first range of the frequency band to be stabilized; and
   wherein both the outer gimbal mount and the inner gimbal mount are designed as mechanically rigid constructions, which transmit vibrations in the frequency band to be stabilized essentially without damping.

2. The gimbal mount according to claim 1, wherein a fastening part, which is connected to a holding frame via the first outer axis of rotation, driven by the direct drive, is provided on the outer gimbal mount, wherein the holding frame is arranged so that it can pivot about the first outer axis of rotation relative to the fastening part.

3. The gimbal mount according to claim 1, wherein a holding frame is arranged on a fastening part of the gimbal mount.

4. The gimbal mount according to claim 2, wherein an outer rolling ring is connected via a second outer axis of rotation, driven by a direct drive, to the holding frame, wherein the outer rolling ring is arranged so that it can pivot around the second outer axis of rotation relative to the holding frame.

5. The gimbal mount according to claim 4, wherein an inner rolling ring is arranged in the outer rolling ring so that it can rotate about a roll axis.

6. The gimbal mount according to claim 2, wherein an inner rolling ring is arranged on the holding frame so that it can rotate about a roll axis.

7. The gimbal mount according to claim 6, wherein a connecting ring is connected via a second outer axis of rotation, driven by a direct drive, to the inner rolling ring, wherein the connecting ring is arranged so that it can pivot about the second outer axis of rotation relative to the inner rolling ring.

8. The gimbal mount according to claim 5, wherein a first driven pulley for a belt is provided on the outer rolling ring or on the holding frame, and a running surface for the belt is provided on the inner rolling ring.

9. The gimbal mount according to claim 2, wherein an inner rolling ring is connected to the holding frame via a second outer axis of rotation, driven by a direct drive, wherein the inner rolling ring is arranged so that it can pivot about the second outer axis of rotation relative to the holding frame.

10. The gimbal mount according to claim 1, wherein the sensor holder is connected via the first inner axis of rotation, driven by the amplified piezo actuator, to a part of the outer gimbal mount, wherein the sensor holder is arranged so it can pivot about the first inner axis of rotation relative to the part of the outer gimbal mount.

11. The gimbal mount according to claim 10, wherein a first support is provided on the sensor holder and the amplified piezo actuator is connected to the first support and to the part of the outer gimbal mount.

12. The gimbal mount according to claim 10, wherein an intermediate ring is provided between the sensor holder and the part of the outer gimbal mount, wherein the intermediate ring is connected via the first inner axis of rotation, which is driven by the amplified piezo actuator, to the part of the outer gimbal mount, wherein the intermediate ring is arranged so that it can be pivoted about the first inner axis of rotation with respect to the part of the outer gimbal mount, and the sensor holder is connected to the intermediate ring via a second inner axis of rotation, which is driven by a second amplified piezo actuator, wherein the sensor holder is arranged so it can pivot about the second inner axis of rotation relative to the intermediate ring.

13. The gimbal mount according to claim 12, wherein a second support is provided on the sensor holder and the second amplified piezo actuator is connected to the second support and to the part of the outer gimbal mount.

14. The gimbal mount according to claim 12, wherein a second support is provided on the sensor holder and the second amplified piezo actuator is connected to the second support and to the intermediate ring.

15. The gimbal mount according to claim 1, wherein all axes of rotation of the outer gimbal mount are embodied with direct drives and all axes of rotation of the inner gimbal mount are embodied with amplified piezo actuators.

16. The gimbal mount according to claim 1, wherein the sensor is a video camera with a lens.

17. The gimbal mount according to claim 1, wherein the cutoff frequency of the gimbal mount is above the frequency range to be stabilized.

18. The gimbal mount according to claim 1, wherein the second range of the frequency band to be stabilized is partially above the first range of the frequency band to be stabilized.

19. A gimbal mount for vibration stabilization in a frequency band to be stabilized for at least one sensor arranged on a sensor holder, the gimbal mount comprising:
    an outer gimbal mount having a number of degrees of freedom;
    an inner gimbal mount arranged on the outer gimbal mount and having a number of degrees of freedom;
    wherein each degree of freedom is formed by an axis of rotation and each axis of rotation is driven by a drive;
    wherein a first outer axis of rotation is provided for vibration stabilization in a first range of the frequency band to be stabilized, and a first inner axis of rotation is provided for vibration stabilization in a second range of the frequency band to be stabilized, wherein the second range of the frequency band to be stabilized is at least partially located above the first range of the frequency band to be stabilized; and
    wherein both the outer gimbal mount and the inner gimbal mount are designed as mechanically rigid constructions, which transmit vibrations in the frequency band to be stabilized essentially without damping.

20. A gimbal mount for vibration stabilization in a frequency band to be stabilized for at least one sensor arranged on a sensor holder, the gimbal mount comprising:
    an outer gimbal mount having a number of degrees of freedom;
    an inner gimbal mount arranged on the outer gimbal mount and having a number of degrees of freedom;
    wherein each degree of freedom is formed by an axis of rotation and each axis of rotation is driven by a drive;
    a fastening part, which is connected to a holding frame via a first outer axis of rotation, driven by a direct drive, is provided on the outer gimbal mount, wherein the holding frame is arranged so that it can pivot about the first outer axis of rotation relative to the fastening part;
    an outer rolling ring connected via a second outer axis of rotation, driven by a direct drive, to the holding frame, wherein the outer rolling ring is arranged so that it can pivot around the second outer axis of rotation relative to the holding frame;
    an inner rolling ring arranged in the outer rolling ring so that it can rotate about a roll axis, wherein the roll axis is driven by a direct drive provided on the outer rolling ring;
    wherein the drive provided for the first inner axis of rotation of the inner gimbal mount is an amplified piezo actuator, wherein the first outer axis of rotation is provided for vibration stabilization in a first range of the frequency band to be stabilized, and the first inner axis of rotation is provided for vibration stabilization in a second range of the frequency band to be stabilized, wherein the second range of the frequency band to be stabilized is at least partially located above the first range of the frequency band to be stabilized; and
wherein the frequency band to be stabilized is between 1 Hz and 150 Hz.

* * * * *